Patented Mar. 21, 1933

1,902,083

UNITED STATES PATENT OFFICE

GEORG KRAENZLEIN AND ERNST DIEFENBACH, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

CONDENSATION PRODUCTS OF THE ANTHRAQUINONE SERIES

No Drawing. Application filed March 6, 1931, Serial No. 520,705, and in Germany March 13, 1930.

The present invention relates to new condensation products of the anthraquinone series.

We have found that new condensation products are obtainable by condensing a compound of the following formula:

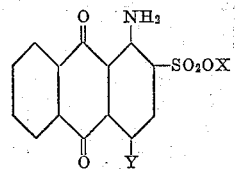

wherein X stands for hydrogen or an alkali metal atom and Y stands for halogen with a compound of the following formula:

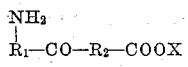

wherein $R_1$ and $R_2$ represent radicals of the benzene series and X stands for hydrogen or an alkali metal atom, the $NH_2$-group in the radical $R_1$ standing in meta-position and the —COOX-group in the radical $R_2$ in ortho-position to the CO-group. The condensation is preferably effected by heating the sodium salts of the components in the presence of water, an acid binding agent, such as sodium carbonate, and a small quantity of a copper compound, such as cuprous chloride or copper sulfate.

The same products are obtainable by condensing a meta-amino-benzoyl-ortho-benzoic acid with a 1-amino-2.4-dihalogen-anthraquinone and exchanging the halogen atom in the 1-amino-2-halogen-4-arylido-anthraquinone thus obtained for a sulfonic acid group, advantageously by treatment with an alkali metal sulfite.

The new products may be characterized by the following formula:

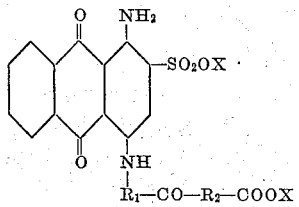

wherein the X's stand for hydrogen or alkali metal atoms and $R_1$ and $R_2$ represents radicals of the benzene series, the NH-group in the radical $R_1$ standing in meta-position and the —COOX-group in the radical $R_2$ in ortho-position to the CO-group. The new products may be used as acid dyestuffs dyeing the fiber blue tints of good fastness to light, washing and fulling, or they may be used as parent materials for the manufacture of other dyestuffs.

The following examples serve to illustrate the invention but they are not intended to limit it thereto, the parts being by weight:

(1) 50 parts of meta-aminobenzoyl-ortho-benzoic acid are dissolved in a solution of 34 parts of anhydrous sodium carbonate in 1000 parts of water. 80 parts of 1-amino-4-bromo-anthraquinone - 2 - sodium - sulfonate and 2 parts of cuprous chloride are added thereto. The mixture is heated to gentle boiling, while vigorously stirring until the formation of the dyestuff is finished. The dyestuff, obtainable by acidifying with dilute hydrochloric acid or salting out by means of sodium chloride is purified by re-precipitating it from its solution in dilute sodium carbonate solution. When dry, the dyestuff forms a blue crystalline powder; it dyes wool beautiful blue tints.

The new dyestuff in the form of its sodium salt corresponds to the formula:

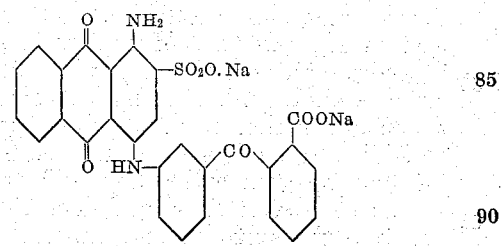

(2) 51 parts of meta-amino-para-toluyl-ortho-benzoic acid are dissolved in 700 parts of water and 30 parts of anhydrous sodium carbonate. To this solution there are added 53 parts of 1-amino-4-bromo-anthraquinone-2-sodium sulfonate and 2 parts of cuprous chloride. The mixture is gently boiled for 15 hours while well stirring. It is worked up in the usual manner, and the dyestuff is obtained in the form of a blue crystalline powder. It dyes wool blue pure tints of good fastness to light, washing and fulling and corresponds to the formula:

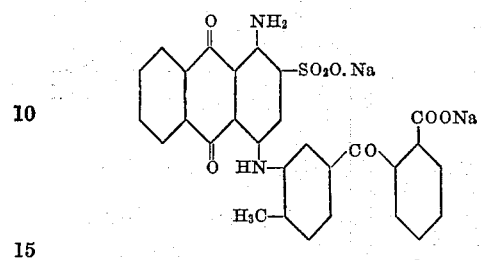

(3) 30 parts of 1-amino-4-bromo-anthraquinone-2-sodium sulfonate and 1 part of cuprous chloride are introduced into a solution of 30 parts of 3'-amino-benzophenone-4'.2-dicarboxylic acid in 24 parts of sodium carbonate and 380 parts of water. After stirring for 24 hours at 95° C.–100° C. the formation of the dyestuff is finished. The dyestuff is isolated in the usual manner. In the dry state it forms a blue crystalline powder; it dyes wool pure blue tints of good fastness to light, washing and fulling.

The dyestuff has in the form of its sodium salt the formula:

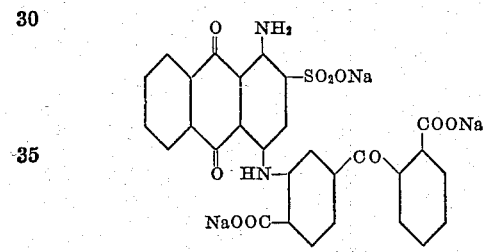

The 3'-amino-benzophenone-4'.2-dicarboxylic acid above referred to can be obtained by reducing the corresponding 3'-nitro-benzophenone-4'.2-dicarboxylic acid (see Liebig's Annalen der Chemie, vol. 309, page 113).

(4) 38 parts of 1-amino-2.4-dibromo-anthraquinone, 38 parts of meta-amino-para-toluyl-ortho-benzoic acid, 20 parts of anhydrous potassium acetate, 0.5 part of copper acetate and 0.5 part of copper bronze are heated to boiling for 20 hours in 350 parts of amyl alcohol, while stirring. After cooling, the condensation product which has separated, is filtered by suction, washed first with alcohol and then with water and dried.

In order to convert the condensation product into the sulfonic acid, 10 parts of the crude product thus obtained, 40 parts of phenol, 8 parts of potassium sulfite in 20 parts of water are gently boiled until the dyestuff has become entirely soluble in water. The phenol is removed by steam distillation from the reaction mixture which is filtered. The dyestuff is precipitated from the filtrate by acidification. It is identical with the dyestuff described in Example 2.

We claim:

1. As a new product, the compound of the following formula:

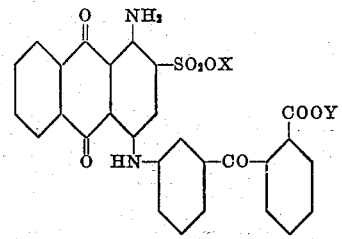

wherein X and Y stand for hydrogen or alkali metal atoms, said product forming a blue crystalline powder, dyeing wool beautiful blue tints.

2. As a new product, the compound of the following formula:

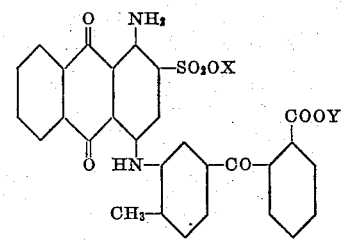

wherein X and Y stand for hydrogen or alkali metal atoms, said product forming a blue crystalline powder dyeing wool pure blue tints of good fastness to light, washing and fulling.

3. As a new product, the compound of the following formula:

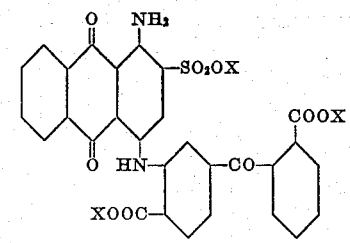

wherein X's stands for hydrogen or alkali metal atoms, said product forming a blue crystalline powder dyeing wool pure blue tints of good fastness to light, washing and fulling.

4. As new products, the compounds of the general formula:

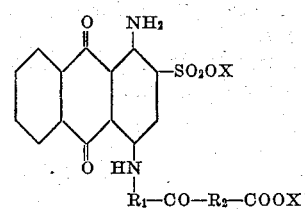

wherein the X's stand for hydrogen or alkali metal atoms and $R_1$ and $R_2$ represent radicals of the benzene series, the NH-group in the radical $R_1$ standing in meta-position and the —COOX-group in the radical $R_2$ in ortho-position to the CO-group, said products forming crystalline powders which dissolve in water to a blue solution and dye wool and silk blue tints of good fastness properties.

In testimony whereof, we affix our signatures.

GEORG KRAENZLEIN.
ERNST DIEFENBACH.